(12) United States Patent
Halliwell

(10) Patent No.: US 12,044,392 B2
(45) Date of Patent: *Jul. 23, 2024

(54) QUICK MOUNT APPARATUS AND METHOD OF USING SAME

(71) Applicant: FEIT ELECTRIC COMPANY, INC., Pico Rivera, CA (US)

(72) Inventor: Brian Halliwell, Chino Hills, CA (US)

(73) Assignee: FEIT ELECTRIC COMPANY, INC., Pico Rivera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,400

(22) Filed: Aug. 4, 2023

(65) Prior Publication Data

US 2023/0375170 A1   Nov. 23, 2023

Related U.S. Application Data

(63) Continuation of application No. 16/843,343, filed on Apr. 8, 2020, now Pat. No. 11,754,272.

(51) Int. Cl.
*F21V 23/06* (2006.01)
*F21V 21/03* (2006.01)
*H01R 9/24* (2006.01)
*H01R 13/621* (2006.01)

(52) U.S. Cl.
CPC .............. *F21V 23/06* (2013.01); *F21V 21/03* (2013.01); *H01R 9/24* (2013.01); *H01R 13/621* (2013.01)

(58) Field of Classification Search
CPC ........... F21V 23/06; F21V 21/03; H01R 9/24; H01R 13/621; H02G 3/14; H02G 3/16; H02G 3/086
See application file for complete search history.

(56) References Cited

U.S. PATENT DOCUMENTS

| 4,096,554 | A | | 6/1978 | Greene |
| 4,368,506 | A | * | 1/1983 | Rapp ....................... F21V 21/03 |
| | | | | 362/147 |
| 6,322,232 | B1 | | 11/2001 | Oliver |
| 9,933,124 | B2 | * | 4/2018 | Ticktin ................... F21V 21/03 |
| 10,326,247 | B2 | | 6/2019 | Kohen |
| 10,680,395 | B2 | | 6/2020 | Chadwell |
| 10,890,191 | B2 | | 1/2021 | Broughman et al. |
| 11,754,272 | B2 | * | 9/2023 | Halliwell ................ F21V 23/06 |
| | | | | 439/536 |
| 2002/0111063 | A1 | | 8/2002 | Kerr |

(Continued)

FOREIGN PATENT DOCUMENTS

| AU | 621690 B2 | 3/1992 |
| CN | 103712184 A | 4/2014 |

(Continued)

*Primary Examiner* — Travis S Chambers
(74) *Attorney, Agent, or Firm* — Alston & Bird LLP

(57) ABSTRACT

Systems, methods, and apparatuses are provided for a quick mount apparatus. The quick mount apparatus includes a mount plate with one or more engaging mechanisms for coupling the mount plate to a mountable device. The quick mount apparatus further includes a first terminal block having extending therefrom building wiring that is fed through a first pass through mechanism of the quick mount apparatus. The first terminal block is electrically couplable with a second terminal block of the mountable device.

20 Claims, 6 Drawing Sheets

(56) References Cited

U.S. PATENT DOCUMENTS

| | | | |
|---|---|---|---|
| 2002/0182917 A1* | 12/2002 | Kerr, Jr. | H02G 3/20 |
| | | | 439/314 |
| 2003/0060067 A1 | 3/2003 | Kerr | |
| 2006/0193151 A1 | 8/2006 | Quan et al. | |
| 2011/0174943 A1 | 7/2011 | Smith | |
| 2013/0182416 A1 | 7/2013 | Wilson | |
| 2016/0072233 A1 | 3/2016 | Martin | |
| 2016/0186974 A1 | 6/2016 | Zaderej et al. | |
| 2019/0280441 A1 | 9/2019 | Chadwell | |
| 2020/0400287 A1 | 12/2020 | Mostoller et al. | |

FOREIGN PATENT DOCUMENTS

| | | |
|---|---|---|
| CN | 203823690 U | 9/2014 |
| EP | 0370825 A2 | 5/1990 |
| WO | 2014/090191 A1 | 6/2014 |

\* cited by examiner

QUICK MOUNT APPARATUS AND METHOD OF USING SAME

CROSS-REFERENCE TO RELATED APPLICATIONS

This application claims priority to and the benefit of U.S. patent application Ser. No. 16/843,343, filed Apr. 8, 2020 (now U.S. Pat. No. 11,754,272, granted Sep. 12, 2023); the entire contents of which as are hereby incorporated by reference herein.

BACKGROUND

Wall mounting of security cameras, fixtures, and other electronic devices conventionally requires equipment specific to the brand or type of security camera or electronic device. Such specific equipment is required due to not only physical constraints imposed by the security camera or other electronic device, but also due to electrical requirements. Moreover, support (e.g., holding up) of the security cameras, fixtures, or other electronic device during the wall mounting process is cumbersome and can lead to mistakes or failures with respect to successful mounting and wiring. Accordingly, installation of security cameras, fixtures, and other electronic devices is complicated, leading to many possible points of failure, and obtaining all of the required equipment can be expensive.

Through applied effort, ingenuity, and innovation many deficiencies of such systems have been solved by developing solutions that are in accordance with the embodiments of the present invention, many examples of which are described in detail herein.

SUMMARY

Embodiments of the present disclosure provide a quick mount apparatus. In embodiments, the quick mount apparatus includes a mount plate with one or more engaging mechanisms for coupling the mount plate to a mountable device, and a first terminal block having extending therefrom building wiring that is fed through a first pass through mechanism, wherein the first terminal block is electrically couplable with a second terminal block of the mountable device.

This Summary does not attempt to completely signify any particular innovation, embodiment, or example as it can be used in commerce. Additionally, this Summary is not intended to signify essential elements of an innovation, embodiment or example or to limit the scope of the subject matter of this disclosure.

The innovations, embodiments, and/or examples found within this disclosure are not all-inclusive, but rather describe the basic significance of the subject matter. Accordingly, one use of this Summary is as a prelude to a Detailed Description presented later.

BRIEF DESCRIPTION OF THE DRAWINGS

The following Detailed Description, Figures, and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such Figures are not necessarily drawn to scale, and are part of the Disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

Figure 1A:
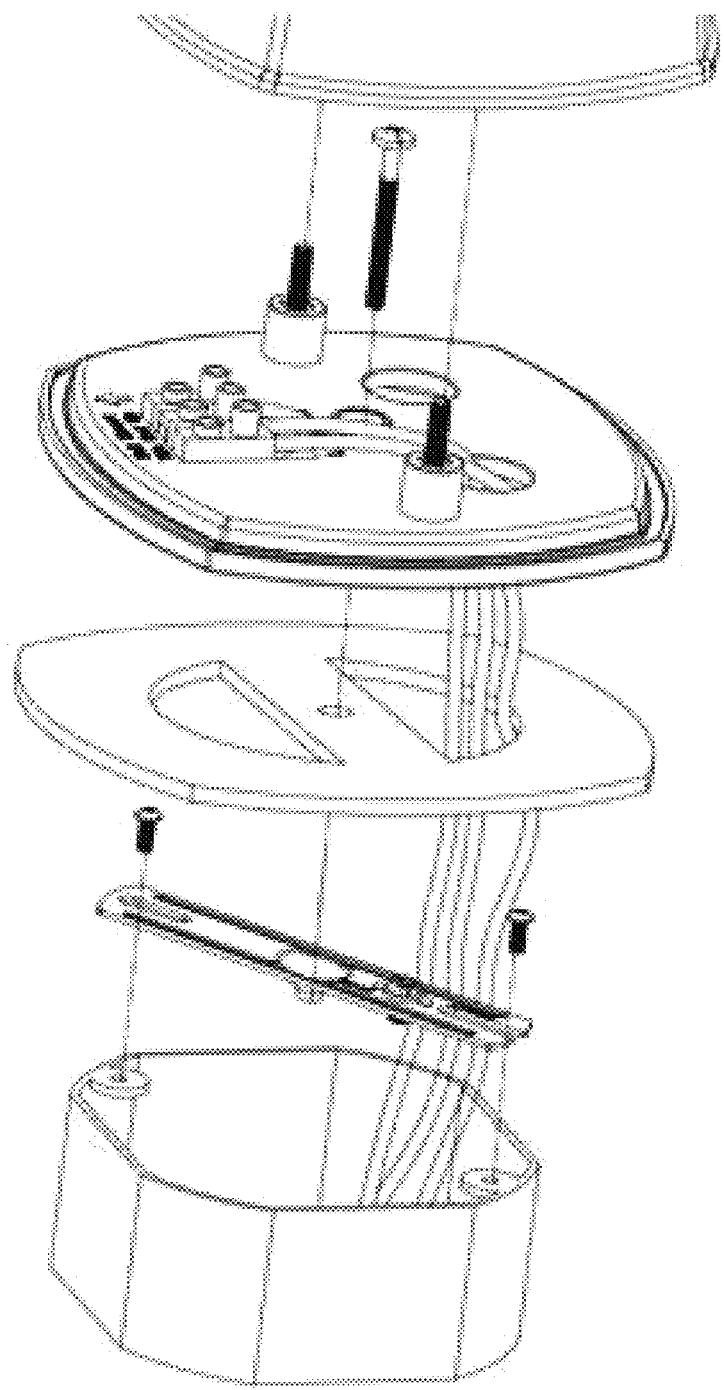
FIG. 1A illustrates a system in which embodiments of the present disclosure may be configured.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

The Figures and the following Detailed Description signify innovations, embodiments and/or examples by way of illustration only, with various features, structures or characteristics described together in a single embodiment to streamline the disclosure. Variations of any of the elements, processes, machines, systems, manufactures or compositions disclosed by such exemplary innovations, embodiments and/or examples will be readily recognized and may be used in commerce without departing from the principles of what is claimed. The Figures and Detailed Description may also signify, implicitly or explicitly, advantages and improvements of a subset of the exemplary embodiments described herein.

In the Figures and Detailed Description, numerous specific details may be described to enable one or more of the exemplary innovations, embodiments and/or examples. In the interest of not obscuring the presentation of the exemplary innovations, embodiments and/or examples in the following Detailed Description, some processing steps or operations that are known in the art may be combined together for presentation and for illustration purposes and might not be described in detail. However, a person skilled in the art will recognize that these exemplary innovations, embodiments and/or examples may be used in commerce without these specific details or with equivalents thereof. In other instances, well-known processes and devices are not described in detail as not to unnecessarily obscure aspects of these exemplary innovations, embodiments and/or examples. In other instances, some processing steps or operations that are known in the art may not be described at all. Instead, the following description is focused on the distinctive features or elements of various exemplary innovations, embodiments and/or examples. Furthermore, while this description may refer to some components of the structure in the singular tense, more than one component may be depicted throughout the Figures and like components are labeled with like numerals.

Embodiments of the present disclosure are directed to a universal quick mount apparatus that eliminates the need for equipment specific to the brand or type of security camera, light fixture, or other electronic device/fixture in order to wall mount the camera/fixture/device to a structure (i.e., a home, building, fence, wall, and the like). Such specific equipment has conventionally been required due to not only physical constraints imposed by the security camera, light fixture, or other electronic device/fixture, but also due to electrical requirements imposed by the devices/fixtures. Moreover, support (e.g., holding up) of the security cameras, fixtures, or other electronic device during the wall mounting process is cumbersome and can lead to mistakes or failures with respect to successful mounting and wiring. Accordingly, because of embodiments of the present disclosure, the complexity and complications associated with installation/wall-mounting of fixtures requiring electrical sources are reduced or eliminated.

Figure 1B:
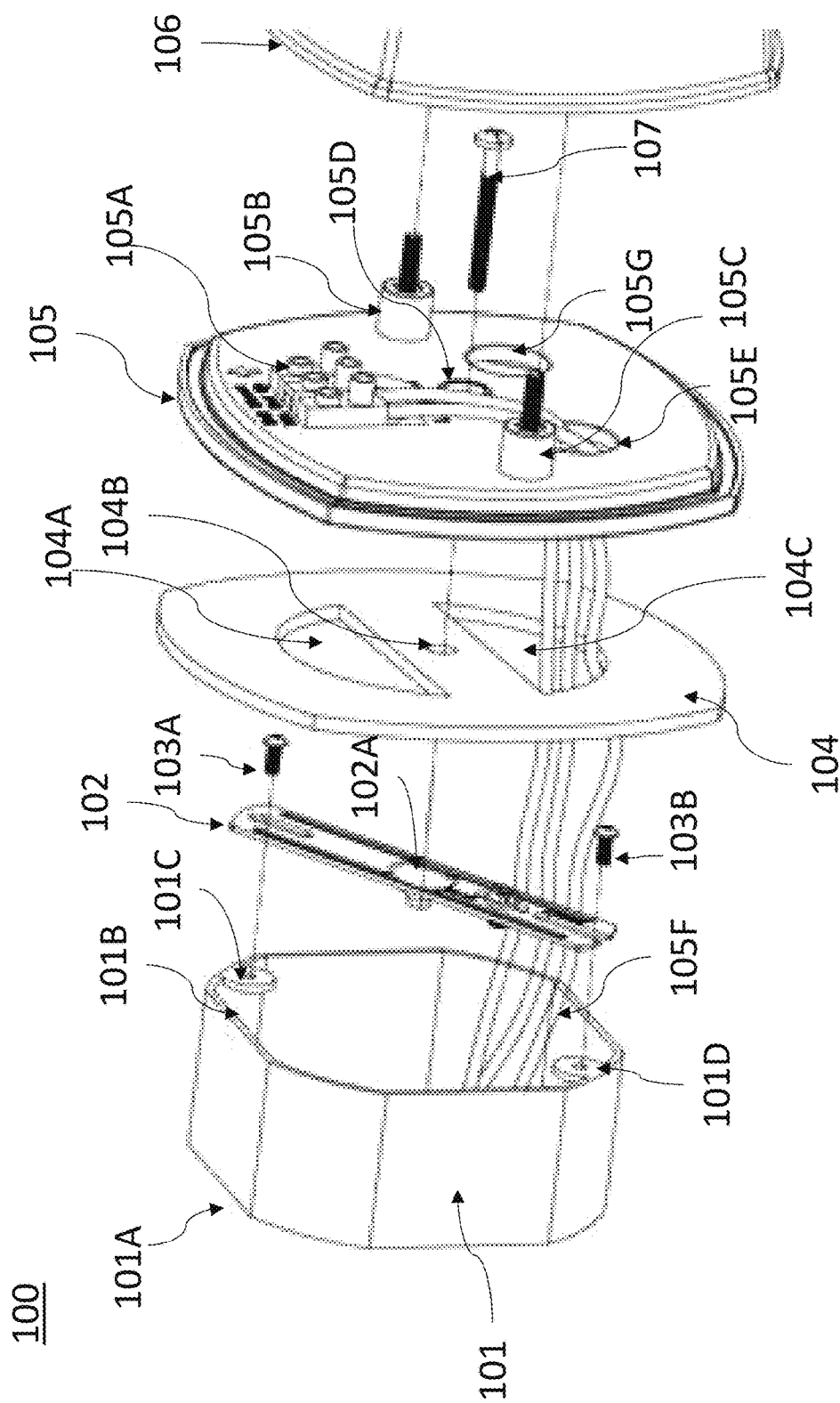
FIG. 1B illustrates a system in which embodiments of the present disclosure may be configured.

FIGS. 1A and 1B illustrate a system 100 in which embodiments of the present disclosure may be configured. In embodiments, system 100 comprises a base 101 (e.g., also referred to as a junction box) to which a mountable device 106 may be attached, with an exemplary quick mount apparatus 105, mounting adapter 102, and weatherproofing layer 104, positioned therebetween.

In embodiments, the base or junction box 101 comprises a lower surface 101A and an upper surface 101B and mounting adapter 102 is mechanically couplable with base 101 at the upper surface 101B of the base 101. It will be appreciated that base or junction box 101 may already be affixed to a structure and need not be provided as part of an entire system to be within the scope of the present disclosure.

Mounting adapter 102 (e.g., also referred to as a mounting bracket) is mechanically couplable with base 101 by way of attachment mechanisms 103A, 103B (e.g., screws) passing therethrough and securing to attachment mechanisms 101C and 101D, respectively. Mounting adapter 102 is mechanically couplable with a weatherproofing layer (e.g., also referred to as a gasket) 104 by way of an attachment mechanism 107 passing through a first engagement mechanism 105D (e.g., a center hole) of the quick mount adapter 105 and an engagement mechanism 104B (e.g., a center hole) of the weatherproofing layer 104 and securing into an area 102A of mounting adapter 102. In embodiments, the weatherproofing layer 104 or gasket may comprise silicon.

In embodiments, weatherproofing layer 104 comprises one or more pass through mechanisms 104A, 104C for feeding through building wiring 105F from the quick mount apparatus 105. The building wiring 105F may be fed through one or more of pass through mechanisms 104A, 104C and routed past mounting apparatus 102 such that it can be passed through base 101 to an electrical or other source.

In embodiments, the exemplary quick mount apparatus 105 is couplable with a mountable device 106 by way of a second engagement mechanism 105B and a third engagement mechanism 105C. The quick mount apparatus 105 will be described in more detail with respect to FIGS. 2-3.

Figure 2:
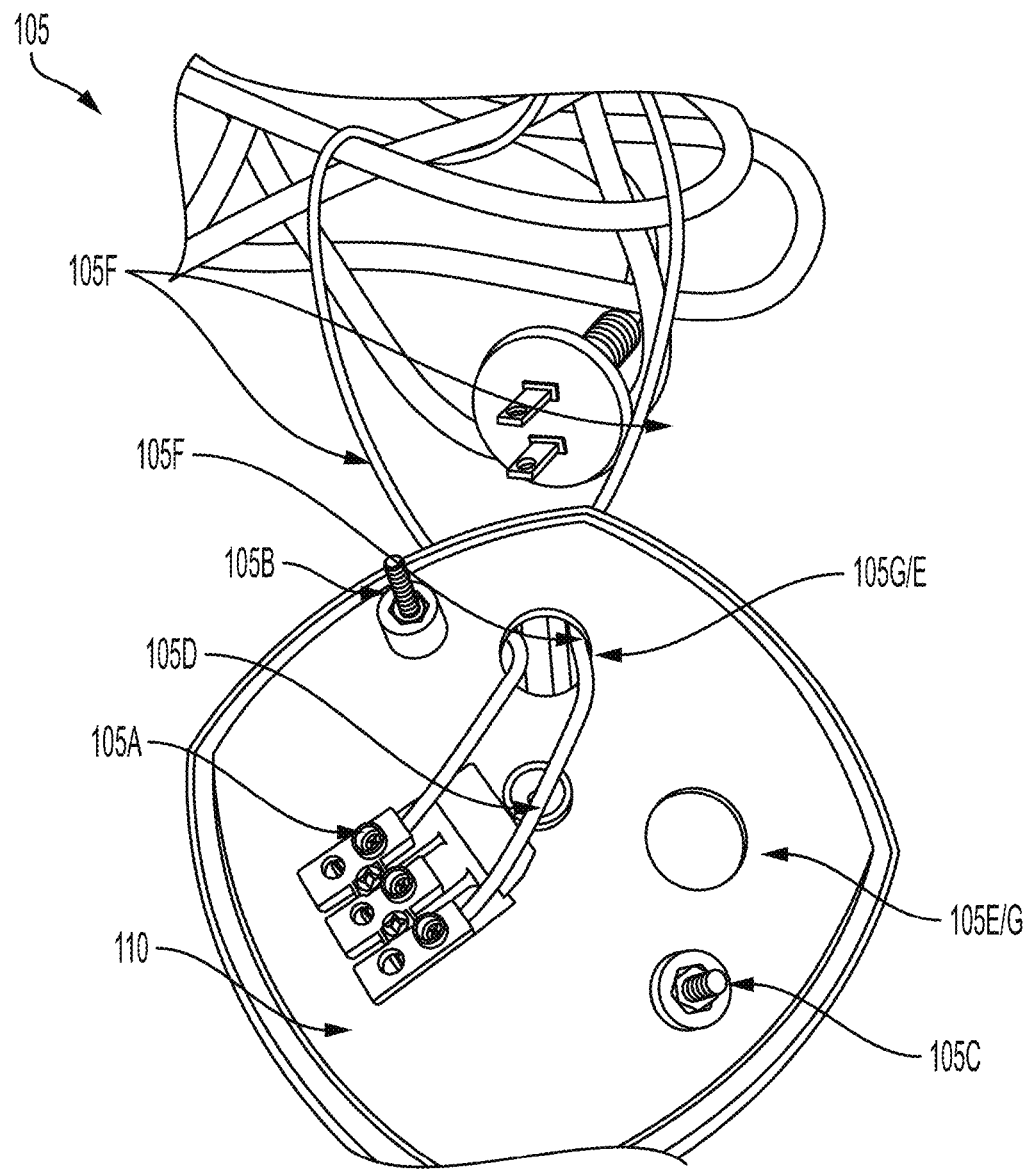
FIG. 2 illustrates a first surface view of an exemplary quick mount apparatus for use with embodiments of the present disclosure.
Figure 3:
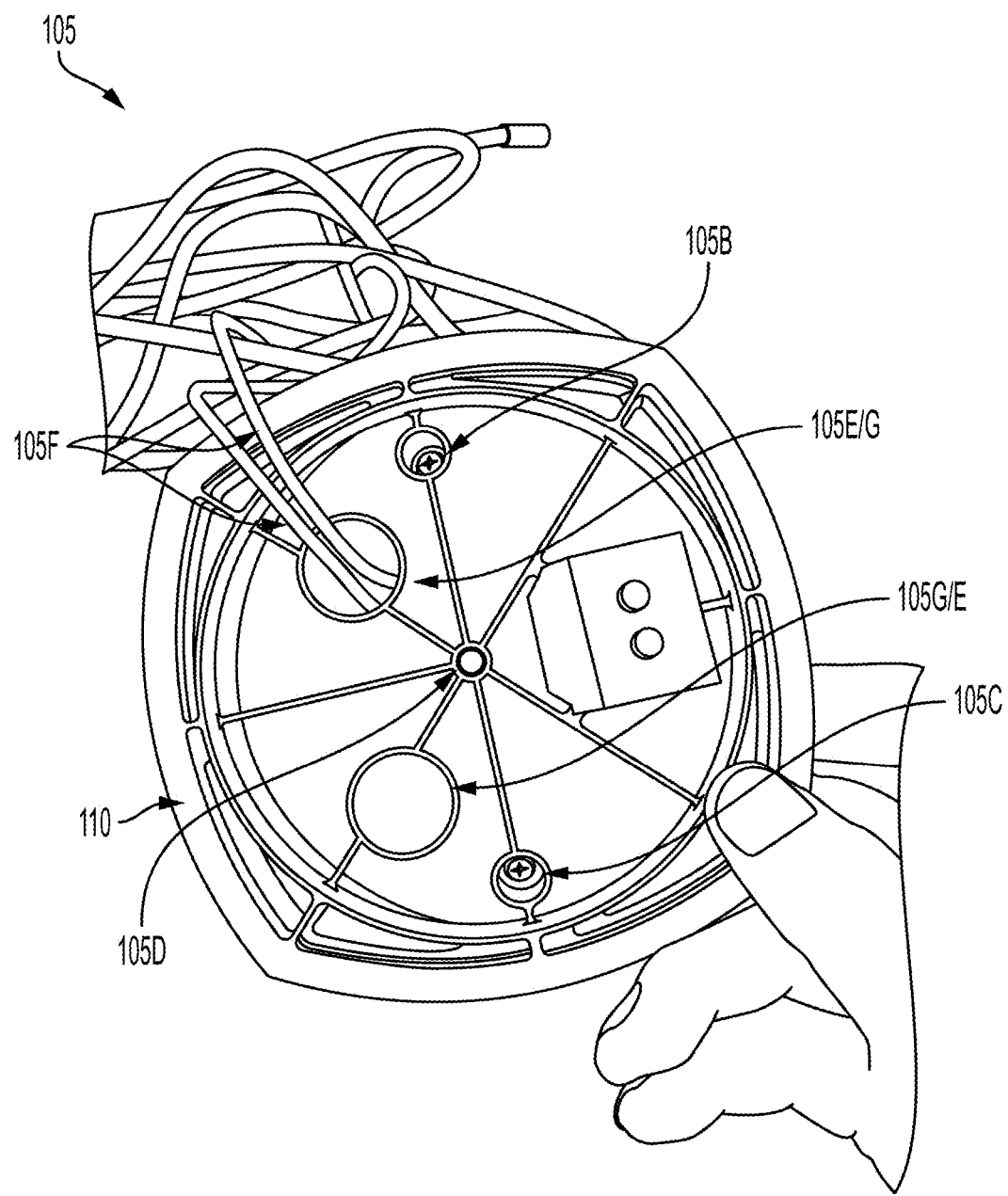
FIG. 3 illustrates a second surface view of an exemplary quick mount apparatus for use with embodiments of the present disclosure.

FIG. 2 illustrates a first surface view of an exemplary quick mount apparatus 105 for use with embodiments of the present disclosure. FIG. 3 illustrates a second surface view of an exemplary quick mount apparatus 105 for use with embodiments of the present disclosure.

In embodiments, an exemplary quick mount apparatus 105 comprises a mount plate 110 having a first mount plate surface (e.g., seen in FIG. 2) and a second mount plate surface (seen in FIG. 3). In embodiments, the first mount plate surface and the second mount plate surface are opposite one another (e.g., the first mount plate surface may be a front of the mount plate 110 and the second mount plate surface may be a rear of the mount plate 110).

In embodiments, the quick mount apparatus 105 comprises a first engaging mechanism 105D (e.g., a hole) positioned in a center of the mount plate 110 and enabling an engagement from beyond the first mount plate surface (e.g., front) through to beyond the second mount plate surface (e.g., rear).

In embodiments, the quick mount apparatus 105 comprises a second engaging mechanism 105B and a third engaging mechanism 105C each horizontally positioned on either side of the mount plate 110 and equidistant from the first engaging mechanism 105D, the second and third engaging mechanisms 105B, 105C couplable to a mountable device 106.

In embodiments, the quick mount apparatus 105 comprises a first pass through mechanism 105E. In embodiments, the quick mount apparatus 105 may comprise a second pass through mechanism 105G. The quick mount apparatus 105 further comprises a terminal block 105A having extending therefrom building wiring 105F that is fed through the first pass through mechanism 105E/105G. That is, building wiring 105F electrically coupled to an electrical source from a structure to which the quick mount apparatus is to be attached is fed through the quick mount apparatus and attaches to the terminal block 105A. In embodiments, the terminal block 105A is electrically couplable with a terminal block of the mountable device 106.

In embodiments, the first engaging mechanism 105D is a first hole through which a screw may be secured.

In embodiments, the second mechanism 105B and third engaging mechanism 105C comprise a screw based mounting post for coupling with the mountable device 106.

In embodiments, the first pass through mechanism 105E/105G is a second hole. In embodiments, the second hole has a diameter that is greater than a diameter of the first engaging mechanism. In embodiments, the diameter of the second hole is sufficient to accommodate a size of the flexible wiring 105F.

In embodiments, the first pass through mechanism 105E and the second pass through mechanism 105G are vertically positioned below the first engaging mechanism 105D and horizontally positioned between the second and third engaging mechanisms 105B, 105C.

Alternatively, the quick mount apparatus comprises one or more engaging mechanisms for coupling the mount plate with the mountable device. In embodiments, the one or more engaging mechanisms comprises a first hole through which a screw may be secured. In embodiments, the one or more engaging mechanisms comprise a screw based mounting post for coupling with the mountable device.

The quick mount apparatus may further comprise an indexing mechanism for aligning the mount plate with the mountable device. That is, the indexing mechanism enables quick and simple alignment of the mount plate and the mountable device during an installations process. In embodiments, the indexing mechanism comprises one or more of a notch, an arrow, a visual indicator, a screw boss, or a molded hole.

In embodiments, the building wiring connects to a junction box attached to a structure. In embodiments, the quick mount apparatus is mountable to the junction box.

In embodiments, the quick mount apparatus provides support for the mountable device during an installation process. In embodiments, the support is hands-free.

Figure 4:
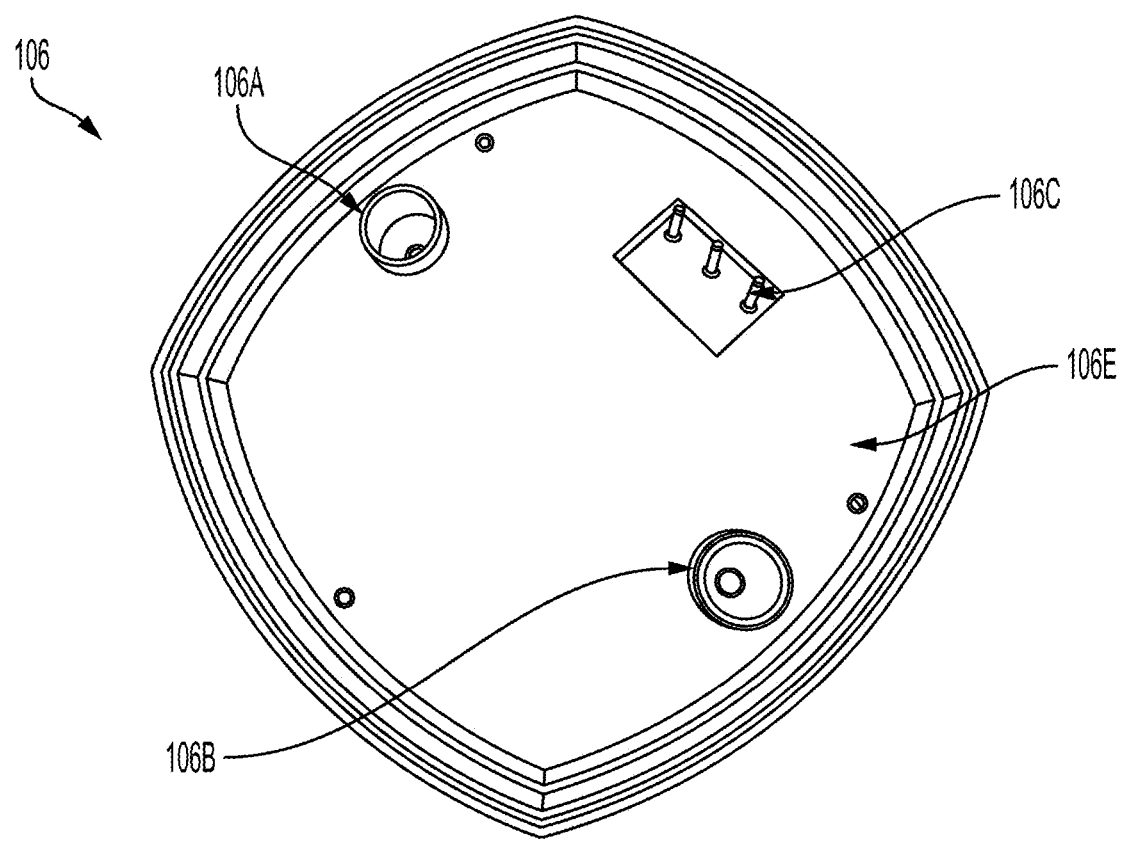
FIG. 4 illustrates a front view of an exemplary mountable device for use with embodiments of the present disclosure.
Figure 5:
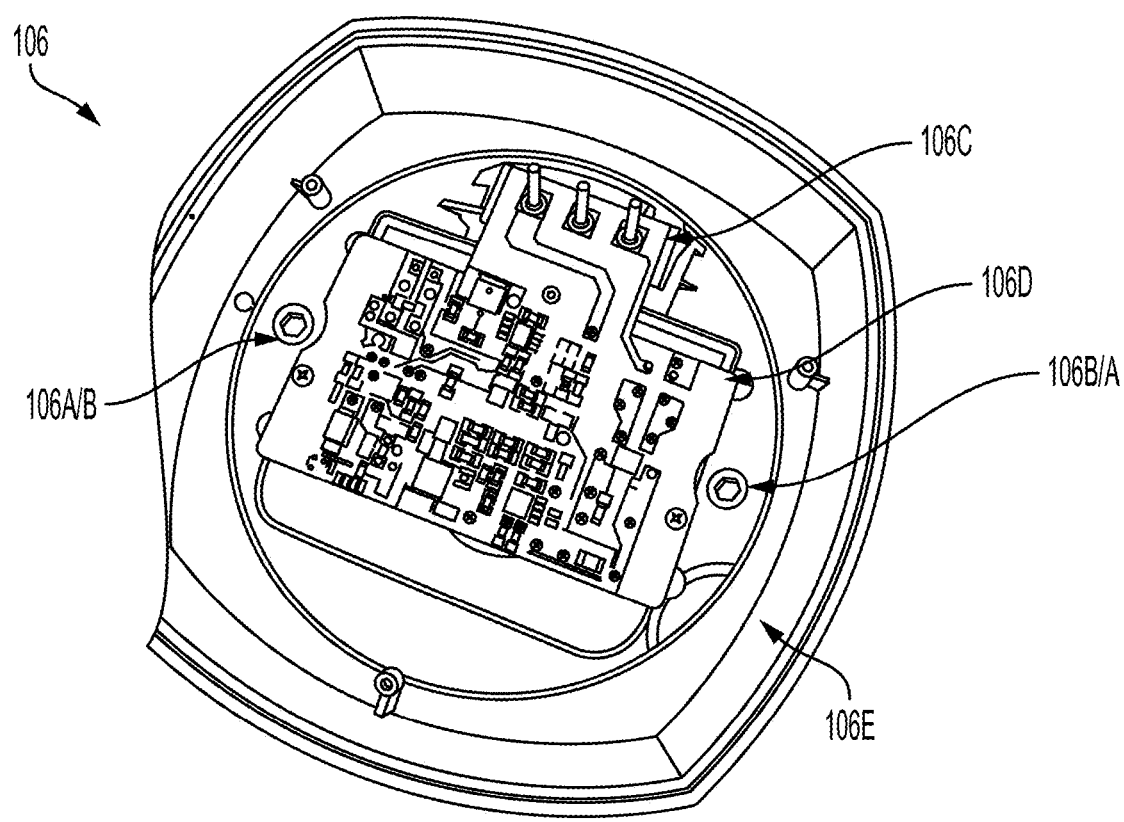
FIG. 5 illustrates a back view of an exemplary mountable device for use with embodiments of the present disclosure.

FIG. 4 illustrates a front view of an exemplary mountable device 106 for use with embodiments of the present disclosure. FIG. 5 illustrates a back view of an exemplary mountable device 106 for use with embodiments of the present disclosure.

In embodiments an exemplary mountable device 106 comprises a fixture mounting plate 106E. In embodiments, the fixture mounting plate 106E has passing therethrough engagement mechanisms 106A, 106B to enable mechanical coupling with a quick mount apparatus 105. The mountable device 106 is electrically couplable, by way of terminal block 106C, with an electronic device such that the electronic device or fixture is powered by way of the building wiring 105F. In embodiments, circuitry 106D is provided for powering an electronic device or fixture.

In embodiments, the terminal block is a universal junction box mount pattern. In embodiments, the terminal blocks of the quick mount apparatus and the mountable device comprise one or more of female connectors or male connectors. That is, when a terminal block of the quick mount apparatus comprises female connectors, the terminal block of the mountable device may comprise male connectors, and vice versa.

In embodiments, the electronic device is one of a security camera, a fixture, an electronic device, an electronic fixture, or a lighting source.

It will be appreciated that the shape of the exemplary quick mount apparatus depicted herein is not intended to be limiting in any way. It will be appreciated that the quick mount apparatus described herein may be formed into any shape without departing from the scope of the present disclosure.

The foregoing Detailed Description signifies in isolation the individual features, structures, functions, or characteristics described herein and any combination of two or more such features, structures, functions or characteristics, to the extent that such features, structures, functions or characteristics or combinations thereof are based on the present specification as a whole in light of the knowledge of a person skilled in the art, irrespective of whether such features, structures, functions or characteristics, or combinations thereof, solve any problems disclosed herein, and without limitation to the scope of the claims. When an embodiment of a claimed invention comprises a particular feature, structure, function or characteristic, it is within the knowledge of a person skilled in the art to use such feature, structure, function, or characteristic in connection with other embodiments whether or not explicitly described, for example, as a substitute for another feature, structure, function or characteristic.

In view of the foregoing Detailed Description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein are chosen to signify the principles of the invention and its useful application, thereby enabling others skilled in the art to understand how various embodiments and variations are suited to the particular uses signified.

The foregoing Detailed Description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the Detailed Description, with each claim standing on its own as a separate embodiment. Disclosed embodiments can be described with more features than are expressly recited in the claims.

What is claimed is:

1. A quick mount apparatus, comprising:
   a mount plate comprising a first terminal block and a first pass through mechanism positioned separately on the mount plate relative to the first terminal block; and
   two or more engaging mechanisms for coupling the mount plate to a mountable device;
   wherein:
   the first terminal block is electrically couplable with a second terminal block of the mountable device; and
   the two or more engaging members comprise either:
   at least a first hole through which a screw may be secured, or
   at least a screw based mounting post for coupling with the mountable device.

2. The quick mount apparatus of claim 1, wherein the first terminal block has extending therefrom building wiring that is fed through the first pass through mechanism.

3. The quick mount apparatus of claim 1, wherein the first pass through mechanism is positioned vertically between two vertical planes defined by two of the two or more engaging mechanisms.

4. The quick mount apparatus of claim 1, wherein the mountable device is powered by way of the building wiring and first and second terminal blocks.

5. The quick mount apparatus of claim 4, wherein the mountable device is one of a security camera, a lighting source, electrical device, or electrical fixture.

6. The quick mount apparatus of claim 1, wherein the first terminal block comprises a universal junction box mount pattern.

7. The quick mount apparatus of claim 1, wherein a weatherproofing layer may be positioned facing a first mount plate surface of the mount plate.

8. The quick mount apparatus of claim 1, wherein the first terminal block comprises female connectors and the second terminal block comprises male connectors.

9. The quick mount apparatus of claim 1, further comprising an indexing mechanism for aligning the mount plate with the mountable device.

10. The quick mount apparatus of claim 9, wherein the indexing mechanism comprises one or more of a notch, an arrow, a visual indicator, a screw boss, or a molded hole.

11. The quick mount apparatus of claim 1, wherein the building wiring connects to a junction box attached to a structure.

12. The quick mount apparatus of claim 11, wherein the quick mount apparatus is mountable to the junction box.

13. The quick mount apparatus of claim 1, wherein the quick mount apparatus provides support for the mountable device during an installation process.

14. A method of installing a mountable device using a quick mount apparatus, the method comprising:
mounting a mount plate of the quick mount apparatus to a junction box attached to a structure; and
coupling the mount plate to a mountable device;
wherein the quick mount apparatus comprises two or more engaging mechanisms for coupling the mount plate to the mountable device, the two or more engaging members comprising either: at least a first hole through which a screw may be secured, or at least a screw based mounting post for coupling with the mountable device, and
wherein the quick mount apparatus further comprises a first terminal block and a first pass through mechanism positioned separately on the mount plate relative to the first terminal block, wherein the first terminal block is electrically couplable with a second terminal block of the mountable device.

15. The method of claim 14, further comprising supporting the mountable device using the quick mount apparatus during installation.

16. The method of claim 14, wherein the mountable device is powered by way of the building wiring and first and second terminal blocks.

17. The method of claim 14, wherein the first pass through mechanism being positioned outside the perimeter of the first terminal block, and the first terminal block having extending therefrom building wiring that is fed through the first pass through mechanism.

18. The method of claim 14, wherein the first pass through mechanism is positioned between two vertical planes defined by two of the two or more engaging mechanisms.

19. The method of claim 14, wherein the quick mount apparatus further comprises an indexing mechanism for aligning the mount plate with the mountable device.

20. The method of claim 19, wherein the indexing mechanism comprises one or more of a notch, an arrow, a visual indicator, a screw boss, or a molded hole.

* * * * *